(12) United States Patent  
Barger et al.

(10) Patent No.: US 8,127,405 B2
(45) Date of Patent: Mar. 6, 2012

(54) REUSABLE HOSE BUNDLING SLEEVE

(75) Inventors: Bradley D. Barger, Monticello, MN (US); Randall J. Brolander, Minneapolis, MN (US)

(73) Assignee: Suburban Machine Co., Inc., Monticello, MN (US)

( * ) Notice: Subject to any disclaimer, the term of this patent is extended or adjusted under 35 U.S.C. 154(b) by 954 days.

(21) Appl. No.: 12/013,726

(22) Filed: Jan. 14, 2008

(65) Prior Publication Data

US 2008/0104804 A1 May 8, 2008

Related U.S. Application Data

(63) Continuation-in-part of application No. 10/464,266, filed on Jun. 18, 2003, now abandoned.

(51) Int. Cl.
*H02G 3/04* (2006.01)

(52) U.S. Cl. .......................... 24/16 R; 24/306
(58) Field of Classification Search .............. 24/16 R, 24/442, 452, 306, 444, 450
See application file for complete search history.

(56) References Cited

U.S. PATENT DOCUMENTS

| | | | |
|---|---|---|---|
| 3,665,561 A | 5/1972 | Heimberger | |
| 3,941,159 A | 3/1976 | Toll | |
| 4,281,211 A | 7/1981 | Tatum et al. | |
| 4,400,420 A | 8/1983 | Bakken et al. | |
| 4,868,955 A | 9/1989 | Magnant et al. | |
| 5,178,923 A | 1/1993 | Andrieu et al. | |
| 5,419,017 A | 5/1995 | Buchanan et al. | |
| 5,535,787 A | 7/1996 | Howell | |
| 5,600,098 A | 2/1997 | Kazaks | |
| 5,651,161 A * | 7/1997 | Asta | 15/325 |
| 5,901,756 A | 5/1999 | Goodrich | |
| 5,943,963 A | 8/1999 | Beals | |
| 5,967,194 A | 10/1999 | Martin | |
| 6,051,291 A | 4/2000 | Gladfelter et al. | |
| 6,286,446 B1 | 9/2001 | Lee | |
| 6,322,483 B1 | 11/2001 | Rotella | |
| 6,523,584 B1 | 2/2003 | Rehrig | |
| 6,543,307 B2 | 4/2003 | Ambrose | |
| 6,822,166 B2 | 11/2004 | James et al. | |
| 2002/0098311 A1 | 7/2002 | Lindner | |
| 2002/0170727 A1 | 11/2002 | Holland et al. | |
| 2004/0255435 A1* | 12/2004 | Barger et al. | 24/306 |
| 2005/0098345 A1* | 5/2005 | Niehaus et al. | 174/135 |

FOREIGN PATENT DOCUMENTS

| | | |
|---|---|---|
| DE | 36 19 399 A1 | 12/1987 |
| GB | 2 043 729 A | 10/1980 |
| WO | 9749539 A1 | 12/1997 |

* cited by examiner

*Primary Examiner* — James Brittain
(74) *Attorney, Agent, or Firm* — Zarley Law Firm, P.L.C.

(57) ABSTRACT

A reusable hose bundling sleeve is provided that is made of a tightly-woven nylon material coated with urethane. Strips of hooks and loops are adhered and stitched to opposite ends of opposite sides of the sleeve. The reusable hose is installed by wrapping the sleeve around the hoses or cables to be protected such that the strips of hooks and loops align and engage. Notches can be cut along the length of the reusable hose bundling sleeve to allow for shorter hoses or cables traveling within the sleeve to exit. Because of the materials used, the notches will not weaken the fibers and cause fraying. The reusable hose bundling sleeve is removed by separating the strips of hooks and loops and unwrapping the sleeve. The reusable hose bundling sleeve can be installed, removed, and reinstalled quickly and without diminishing the durability of the sleeve. Alternatively, the sleeve may be adapted to be secured and/or hanged.

14 Claims, 11 Drawing Sheets

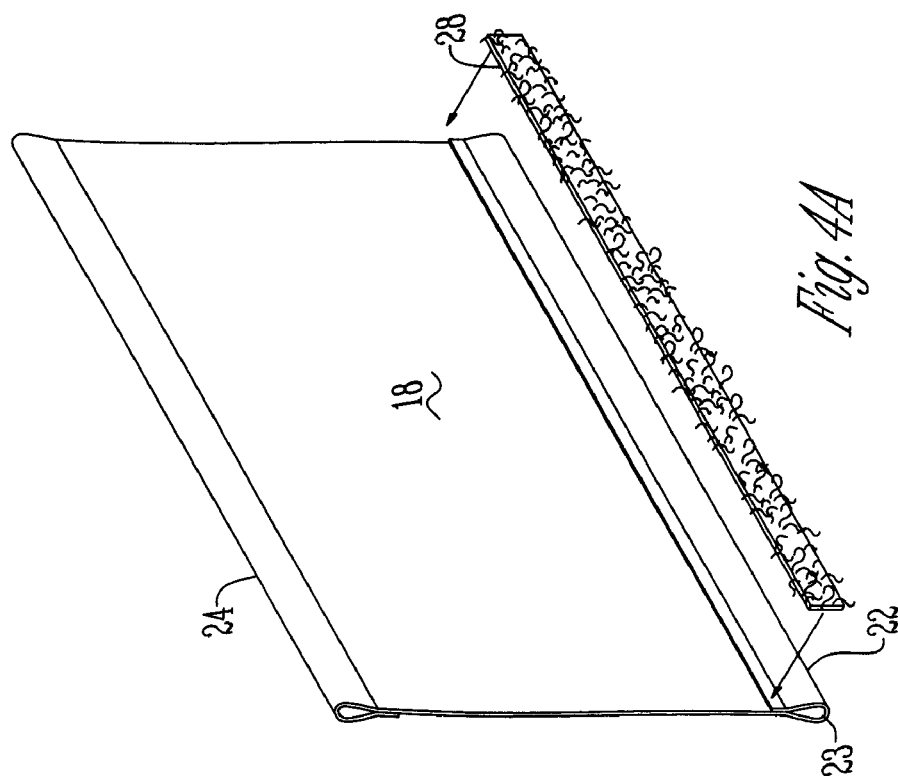
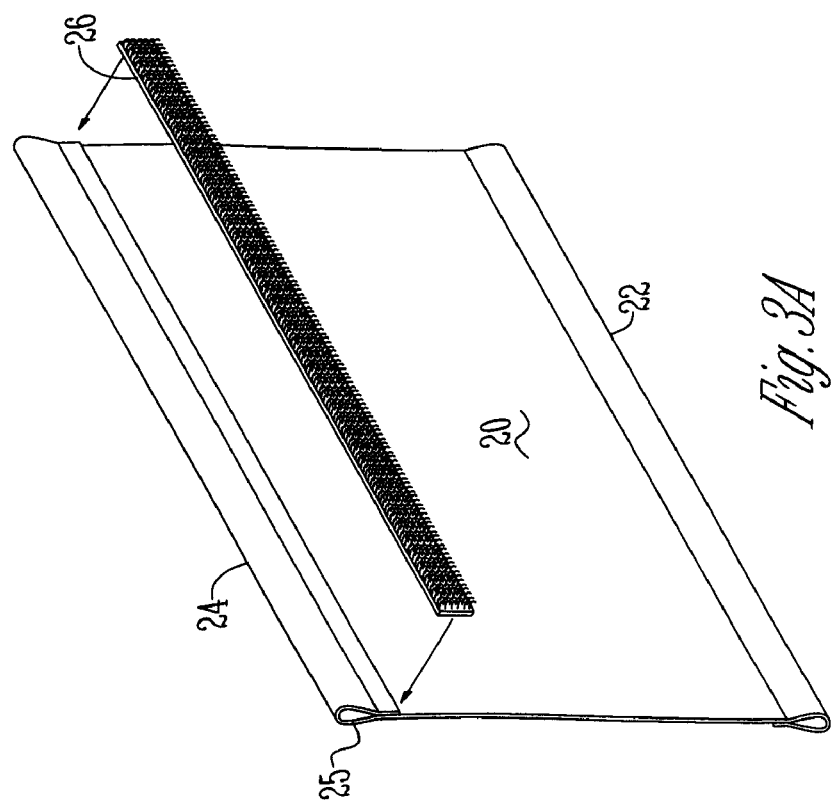

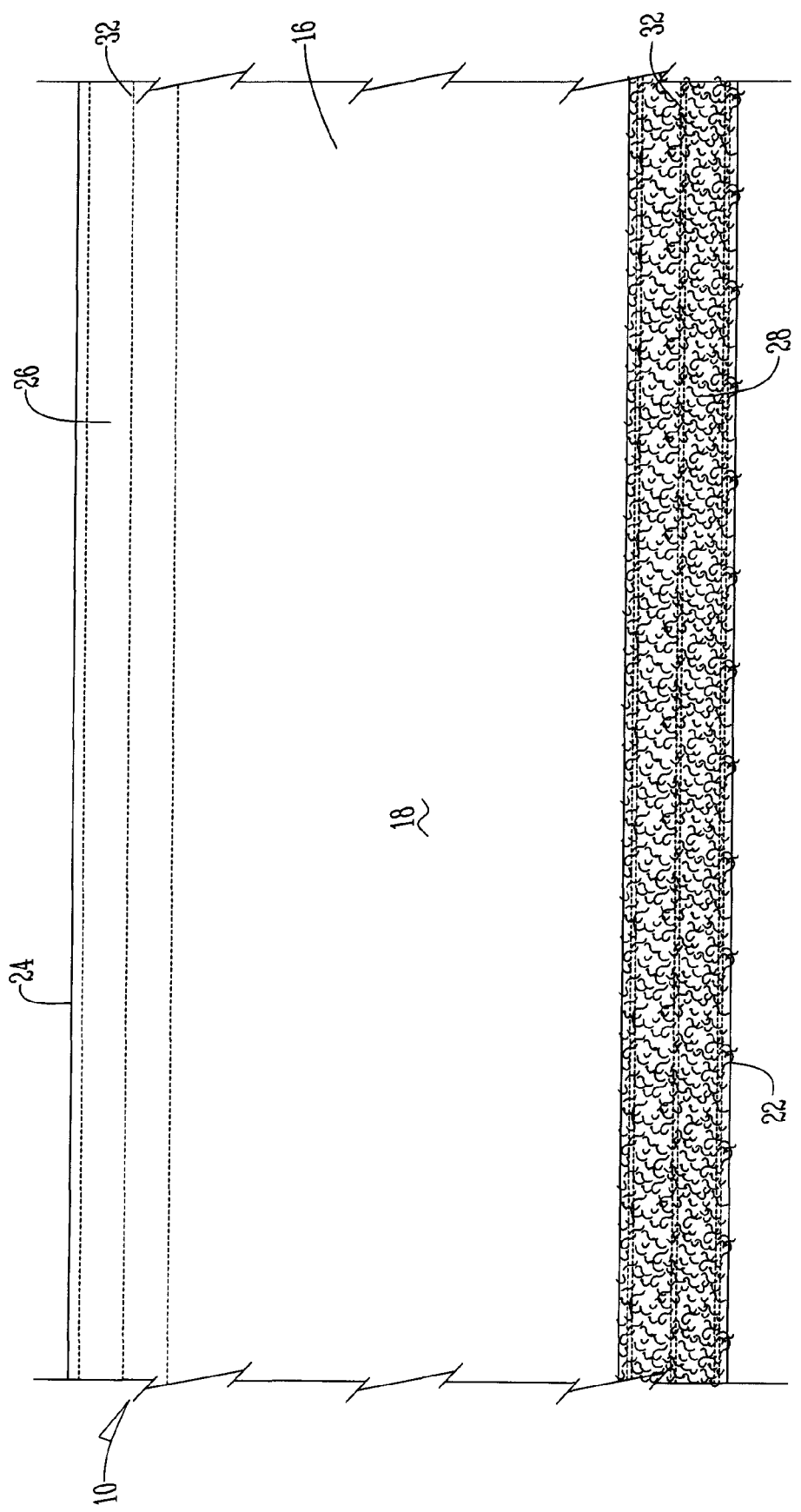

REUSABLE HOSE BUNDLING SLEEVE

REFERENCE TO PRIOR APPLICATION

This is a continuation-in-part of U.S. patent application Ser. No. 10/464,266 filed on Jun. 18, 2003, which is incorporated herein by reference.

BACKGROUND OF THE INVENTION

The present invention relates to hydraulic hoses and electrical cables and, more particularly, to reusable bundling sleeves for such hoses and cables.

Hose sleeves typically are used to cover hydraulic hoses and electrical cables and protect them from abrasion as well as insulate them from high temperatures. On many vehicles or heavy machinery, hydraulic and electrical lines oftentimes run alongside engines, motors, or other moving components. During operation, the vibration and heat created by these components tend to degrade nearby hydraulic and electrical lines. Because of this, hose sleeves are used to provide a layer of protection between the hydraulic and electrical lines and the engine components.

Conventional hose sleeves consist of a one-piece tubular member. Hydraulic hoses and electrical cables must be disconnected and fed individually through the entire length of a conventional hose sleeve. Because conventional hose sleeves often are made of a thick knitted material, such as DuPont Cordura®, they are stiff and difficult to work with. Installing a hose sleeve typically requires constant manipulation to thread the hose sleeve around the hydraulic or electrical line.

Because conventional hose sleeves are made of a one-piece tubular member, they do not allow for shorter hoses or cables traveling within the hose sleeve to exit at a point along the length of the sleeve. Cutting a hole or slit at a point along the length of a conventional hose sleeve decreases the durability of the fibers at that point and only encourages the fibers to fray and provide less protection to the hoses and cables traveling within.

Replacing a conventional hose sleeve also is problematic. To remove conventional hose sleeves, the hydraulic and electrical lines traveling through the hose sleeve must be disconnected and withdrawn from the sleeve. Disconnecting a hydraulic hose disrupts the hose fittings which may promote leakage. Further, disconnecting the hydraulic hose may expose the hydraulic system to contaminants. Oftentimes, in the field, repair technicians will remove conventional hose sleeves simply by cutting and tearing them off. Because installation of conventional hose sleeves is so labor intensive, repair technicians oftentimes do not install replacement hose sleeves according to the manufacturer's specifications, thereby diminishing the effectiveness of the hose sleeve. It is also not uncommon for field technicians, in the interest of time, to forego installing replacement hose sleeves, thereby exposing the hydraulic and electrical lines to increased abrasion and temperature degradation.

Another disadvantage of conventional hose sleeves is that they wear out quickly. As a conventional hose sleeve rubs against a surface or edge, internal fibers break, causing the thick knitted material to fray or appear fuzzy. This fraying causes the product to weaken and expand, thereby encouraging further hose abrasion. Additionally, the thick knitted material typically used with conventional hose sleeves does not provide protection against ultraviolet (UV) radiation. As such, hose sleeves on external hydraulic or electrical lines will degrade from exposure to sunlight and not provide long-lasting effective protection.

To ensure that conventional hose sleeves do not travel about the hoses and cables running within, manufacturers often will use cable ties or the like to cinch the hose sleeve in place. The necessity of tying down conventional hose sleeves becomes problematic as the ties pinch or place undue pressure upon the hoses and cables running within. Sensitive cables, such as fiber optic lines, will not function properly if pinched.

It is therefore a principal object of this invention to provide a hose bundling sleeve that can be easily installed, removed, and reused.

Another object of this invention is to provide a hose bundling sleeve that can accommodate different lengths of hoses and cables, allowing shorter hoses and cables to exit the hose sleeve at any point along the length of the invention.

A further object of this invention is to provide a hose bundling sleeve that resists degradation from abrasion, vibration, and UV radiation.

Still a further object of this invention is to provide a hose bundling sleeve that can accommodate hydraulic hoses, electrical cables, and fiber optic lines without the need for ties that pinch or place undue pressure on the lines.

These and other objects will be apparent to those skilled in the art.

BRIEF SUMMARY OF THE INVENTION

The present invention is directed towards a reusable hose bundling sleeve. The present invention is made of a tightly-woven nylon material coated with urethane. Strips of hooks and loops, with urethane-coated backings, are adhered and stitched to opposite ends of opposite sides of the sleeve, the ends having been once folded over for enhanced durability. Three rows of chain stitching are used to attach each strip of hooks and loops to the nylon material. When the hose sleeve is installed, the runner of the chain stitching is located on the inside of the hose sleeve. Because of the materials used, the present invention resists abrasion from vibration and heat as well as degradation from exposure to UV radiation.

The present invention is installed by wrapping the sleeve around the hoses or cables to be protected such that the strips of hooks and loops align and engage. Because the hooks and loops form such a strong connection, there is no need for using cable ties or the like to secure the hose sleeve in place. Notches also can be cut along the length of the present invention to allow for shorter hoses or cables traveling within the sleeve to exit. Because of the materials used, the notches will not weaken the fibers and cause fraying.

The present invention is removed by separating the strips of hooks and loops and unwrapping the sleeve. The present invention can be installed, removed, and reinstalled quickly and without diminishing the durability of the sleeve. The sleeve may be adapted to be secured and/or hanged.

BRIEF DESCRIPTION OF THE DRAWINGS

FIG. 3A is a perspective side view of the present invention;

FIG. 4 is the reverse side of the present invention shown in FIG. 3;

FIG. 4A is a perspective side view of the present invention, and the reverse of the view shown in FIG. 3A;

DESCRIPTION OF THE PREFERRED EMBODIMENT

Figure 1:
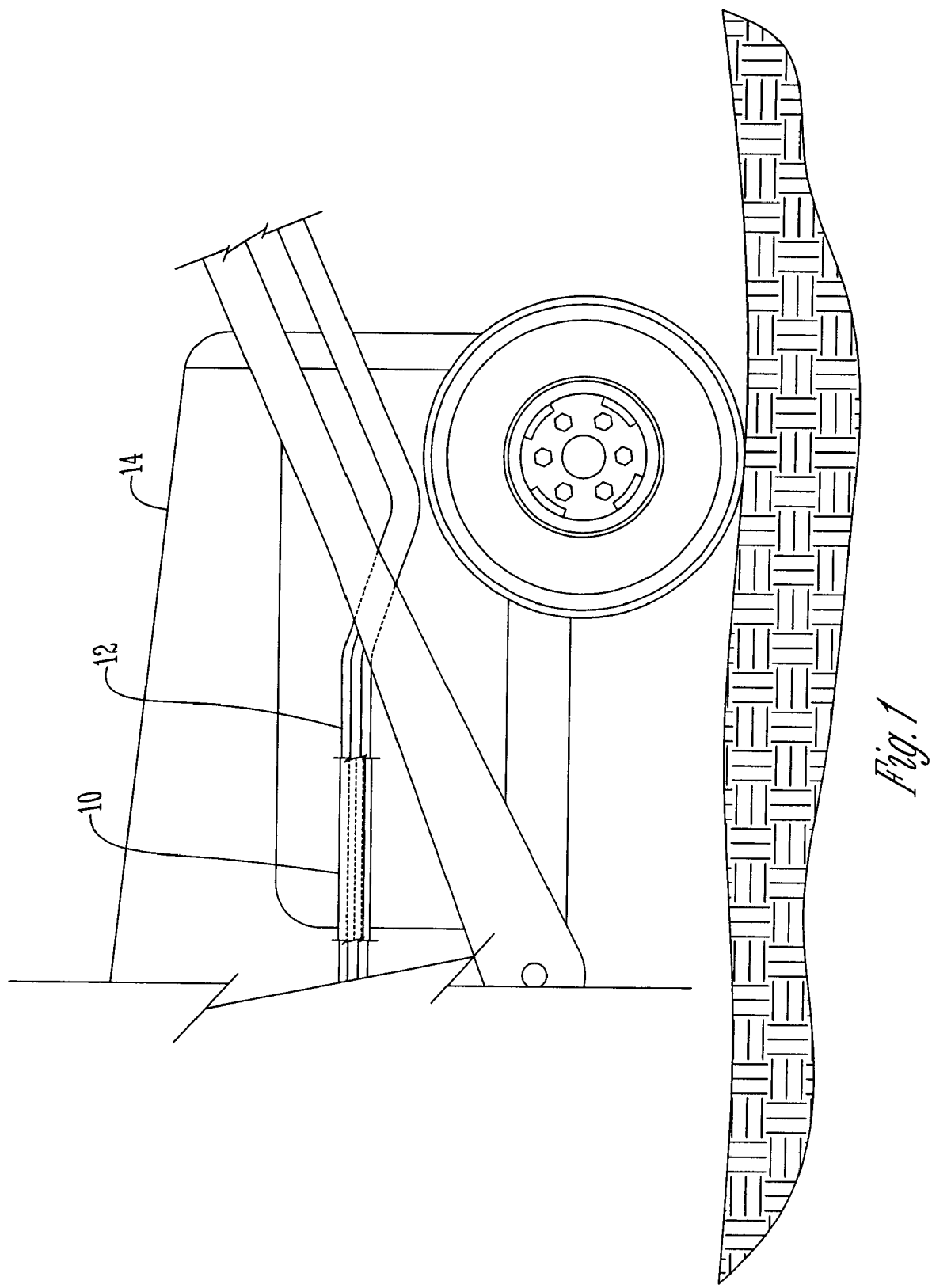
FIG. 1 is a partial side view of a vehicle equipped with the present invention.

With respect to FIG. 1, a hose sleeve 10 is disclosed for use with bundling hydraulic hoses 12 typically found on heavy machinery 14 or other vehicles. Hose sleeve 10 also may be used with electrical cables, fiber optic lines, and any other type of conduit. Further, hose sleeve 10 may be used on any number of applications other than vehicles. For example, hose sleeve 10 also may be used to protect data lines running through the walls or ceilings of a home or office building. Hose sleeve 10 protects hydraulic hoses 12 or any other conduits traveling within from abrasion caused by vibration and heat as well as degradation from exposure to UV radiation.

Figure 2:
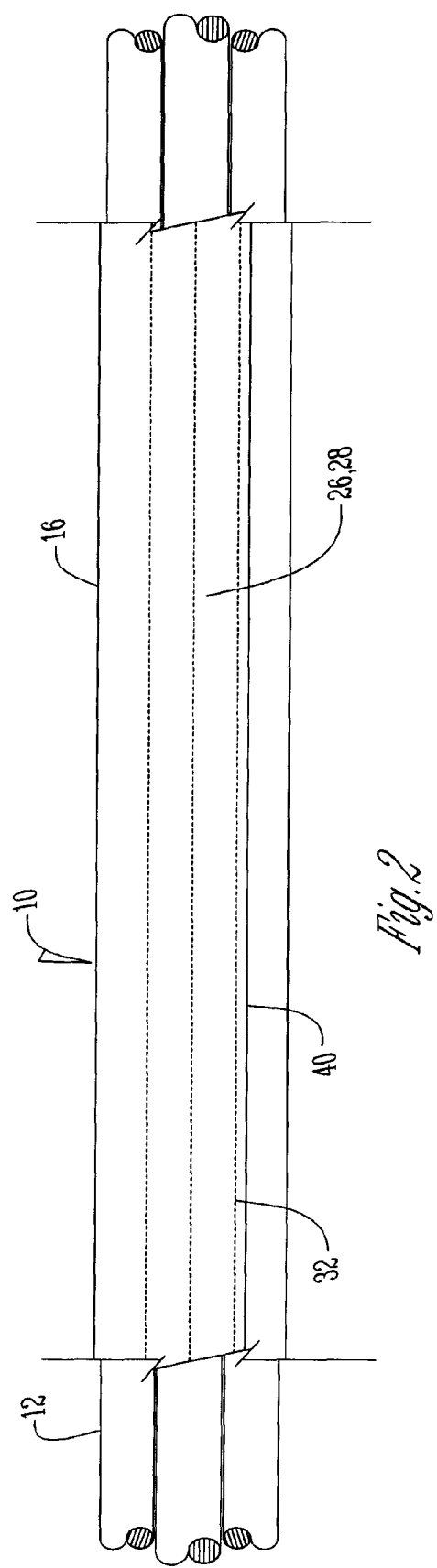
FIG. 2 is a side view of the present invention when fastened around hydraulic hoses.
Figure 3:
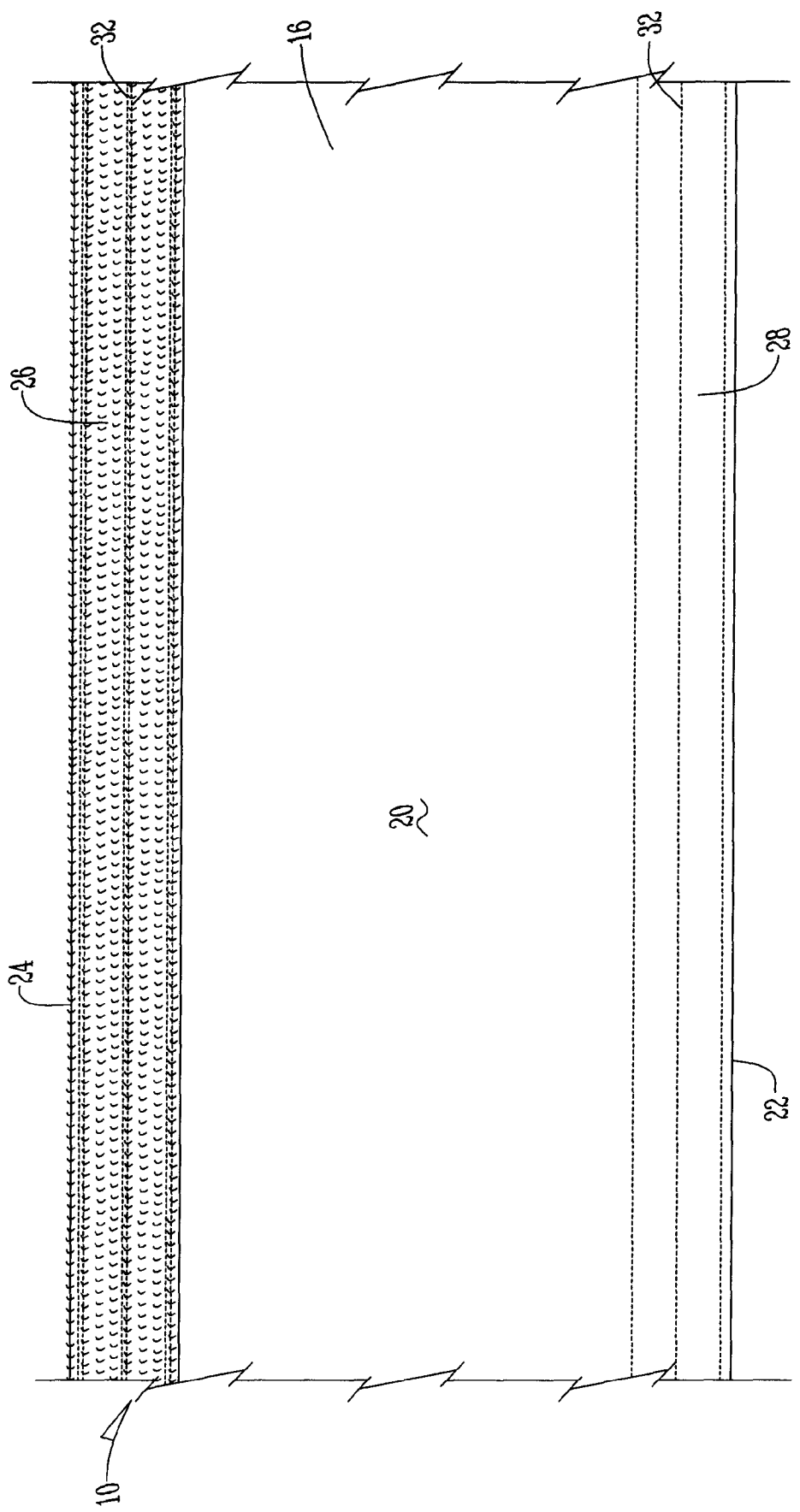
FIG. 3 is a plan view of the present invention when opened and lying flat.

With respect to FIGS. 2-6, hose sleeve 10 includes an elongated section of material 16. Elongated section of material 16 includes a front surface 18 (FIG. 4) opposite a reverse surface 20 (FIG. 3). Elongated section of material 16 also includes a first edge 22 opposite a second edge 24. As depicted in FIGS. 3A and 4A, first edge 22 and second edge 24 are each folded over in opposite directions such that each edge is rounded and such that lips 23, 25 are formed on front surface 18 and reverse surface 20, respectively. Persons skilled in the art will appreciate that folding provides first edge 22 and second edge 24 with added durability inasmuch as the edges are effectively thicker and less susceptible to fraying.

Material 16 is a tightly-woven nylon, such as 1000 denier or 1050 ballistic weave. In addition, material 16 is coated with urethane. Coating the material 16 with urethane provides many advantages. First, urethane coating allows for the use of a lighter weight nylon, as opposed to the thicker knit conventional hose sleeves. A lighter weight nylon is more flexible and allows hose sleeve 10 to be easily wrapped around hydraulic hoses 12 or other conduits. The lighter weight nylon also allows hose sleeve 10 to be installed on hydraulic hoses 12 with bends or curves. Urethane coating also creates a slicker surface than the thicker knit conventional hose sleeves. A slicker surface allows hose sleeve 10 to slide easily over other surfaces and edges, thereby minimizing friction and abrasion. The slicker surface also allows the hoses and cables traveling within hose sleeve 10 to flex. Finally, urethane coating ensures that elongated section of material 16 will not be degraded by UV radiation.

Still referring to FIGS. 3 and 4, hose sleeve 10 also includes strips of hooks 26 and loops 28 attached to opposite sides of opposite edges of the elongated section of material 16. Specifically, strip of hooks 26 is attached to the reverse surface 20 of elongated section of material 16, near second edge 24 and directly over lip 25 (see FIGS. 3a, 5). Strip of loops 28 is attached to the front surface 18 of elongated section of material 16, near first edge 22 and directly over lip 23 (see FIG. 4a). Strips of hooks 26 and loops 28 are of a heavy duty construction, containing about fifteen to twenty percent more hooks per inch as compared to standard hook and loop material, such as that sold under the Velcro® brand. In addition, the strips of hooks 26 and loops 28 have a backing coated with urethane. The urethane coating provides all the advantages as discussed above.

Each strip of hooks 26 and loops 28 has a width about one-fifth the width of the elongated section of material 16. Therefore, the width of the strip of hooks 26 plus the width of the strip of loops 28 comprises about two-fifths the width of elongated section of material 16. In any event, strip of hooks 26 and strip of loops 28 are wider than lips 23 and 25.

Figure 5:
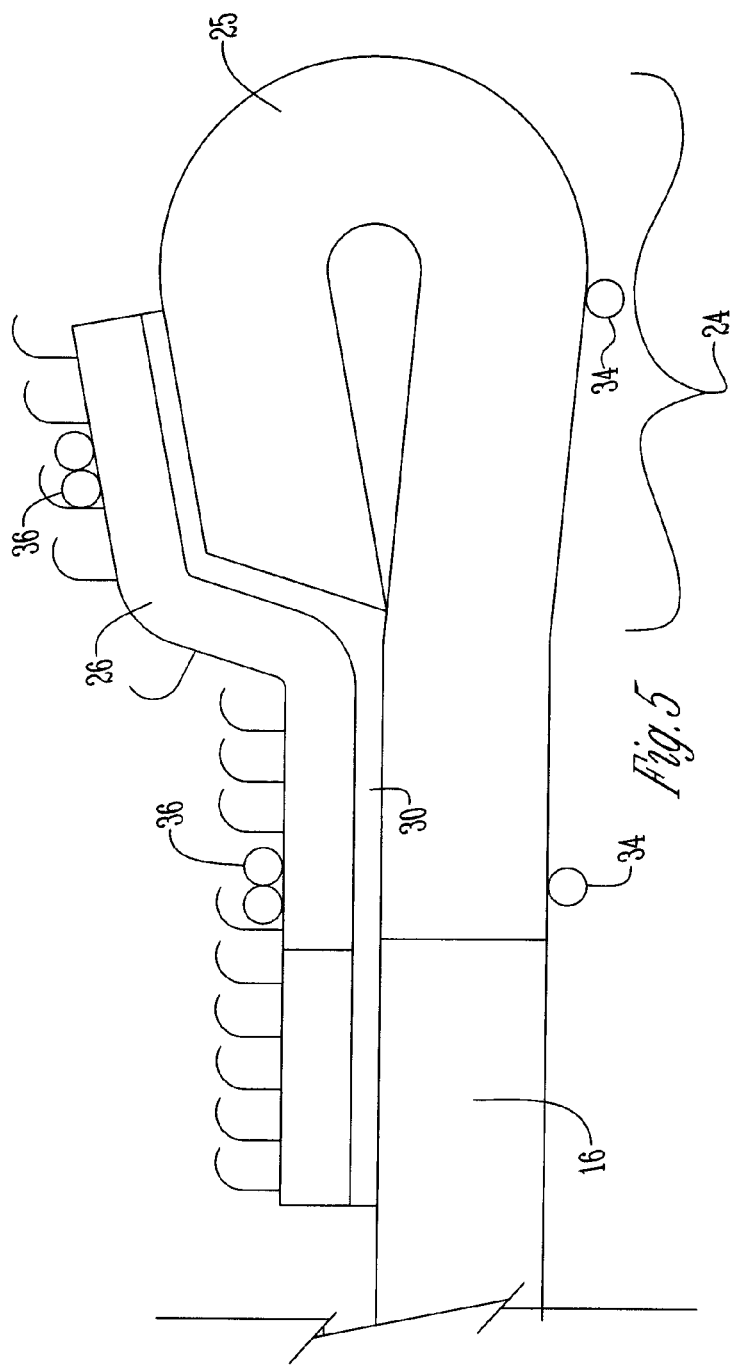
FIG. 5 is a cross-sectional view of the present invention.

In attaching strips of hooks 26 and loops 28 to the elongated section of material 16, the strips are first adhered to material 16. As shown in FIG. 5, for example, a layer 30 of low-temperature adhesive is applied to the elongated section of material 16 near second edge 24 of reverse surface 20, including lip 25. A strip of hooks 26 is then placed on the layer 30 of adhesive. The strip of hooks 26 is then sewn to the elongated section of material 16 with stitching 32. This process is repeated for attaching strip of loops 28 to the elongated section of material (not shown). Specifically, a layer 30 of low-temperature adhesive is applied to the elongated section of material 16 near first edge 22 of front surface 18, including lip 23. A strip of loops 28 is then placed on the layer 30 of adhesive. The strip of loops 28 is then sewn to the elongated section of material 16 with stitching 32.

The material 16 is then placed in an oven that heats the layer 30 of low-temperature adhesive without damaging the strips of hooks 26 and loops 28. After heating the adhesive, the strips of hooks 26 and loops 28 are rolled or pressed to ensure that the adhesive flows around the stitching 32. Upon heating, the layer 30 of adhesive serves to lock the stitchwork, effectively preventing stitching 32 from unraveling even if the stitching 32 should break or wear after installing the hose sleeve 10.

Figure 6:
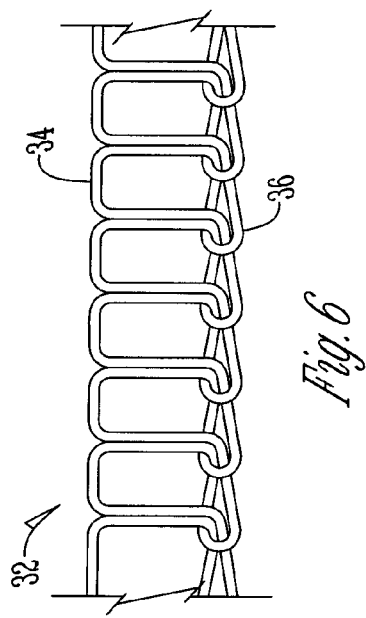
FIG. 6 is a cross-sectional view of the chain stitching of the present invention.

Three rows of stitching 32 are used to attach each strip of hooks 26 and loops 28. The middle row of stitching 32 ensures that the strips of hooks 26 and loops 28 do not separate from the elongated section of material 16 when pulling the strip of hooks 26 away from the strip of loops 28. Stitching 32 preferably consists of chain stitches 34 with runners 36 (FIG. 6). Chain stitches 34 are advantageous because they allow the sewing process to be automated. Chain stitching can be accomplished without the use of bobbins, which reduces the time and labor necessary to thread and replace the bobbins. Chain stitching also provides the strength necessary for repeated use of the hose sleeve 10. When sewing the strips of hooks 26 and loops 28 onto elongated section of material 16, care is taken to ensure that the runners 36 of each row of stitching 32 are located inside hose sleeve 10 when it is installed, as discussed below. Specifically, the runners 36 of the three rows of stitching 32 securing the strip of hooks 26 to the elongated section of material 16 will be located on the reverse surface 20 of the material 16, nested in the strip of hooks 26. Similarly, the runners 36 of the three rows of stitching 32 securing the strip of loops 28 to the elongated section of material 16 will be located on the front surface 18 of the material 16, nested in the strip of loops 28. This is advantageous because the runners 36 are the weakest portion of chain stitches 34. Breaking a runner 36 may cause the entire stitching 32 to unravel. By placing the runners 36 inside the hose sleeve 10, the runners 36 will not be exposed to external surfaces and edges that can wear away at the runners 36. It should be noted, though, that the layer 30 of adhesive prevents the runners 36 from unraveling even if the runners 36 should break or wear after installing the hose sleeve 10.

Hose sleeve 10 is installed by placing the reverse surface 20 of elongated section of material 16 against the hydraulic hose 12 or any other conduit to be protected. The elongated section of material 16 is then wrapped around hose 12 such that the strip of hooks 26 engages with the strip of loops 28. The strips of hooks 26 and loops 28 form a strong connection such that elongated section of material 16 firmly covers hose 12, as best shown in FIG. 2. Because of the strong connection of strips of hooks 26 and loops 28, cable ties or the like are not needed to secure hose sleeve 10 about the hydraulic hose 12 or other conduits being protected. Hose sleeve 10 firmly wraps around hose 12 such that hose sleeve 10 will not travel about hose 12, even when hose sleeve 10 is used in an environment with high vibration or abrasion. It should be noted, though, that hose sleeve 10 firmly encompasses hose 12 without pinching or placing undue pressure on hose 12 or the conduits traveling within.

Removing hose sleeve 10 is easily done by grasping the second edge 24 and pulling the strip of hooks 26 away from the strip of loops 28. After the strips of hooks 26 and loops 28 have been disengaged, the elongated strip of material 16 is free to be unwrapped from hose 12 or the conduit traveling within. Because the strips of hooks 26 and loops 28 are securely attached to the elongated section of material 16 by the layer 30 of adhesive, the three rows of stitching 32, and subsequent heating, hose sleeve 10 can be installed, removed, and reinstalled numerous times without damaging hose sleeve 10.

Figure 7:
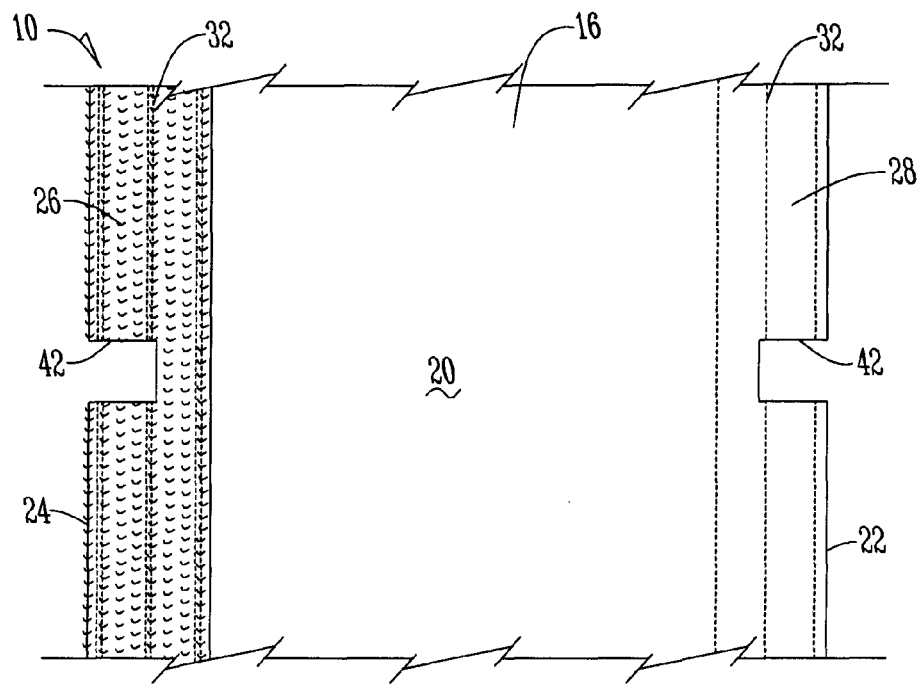
FIG. 7 is a view similar to FIG. 3 except that the present invention has been notched.
Figure 8:
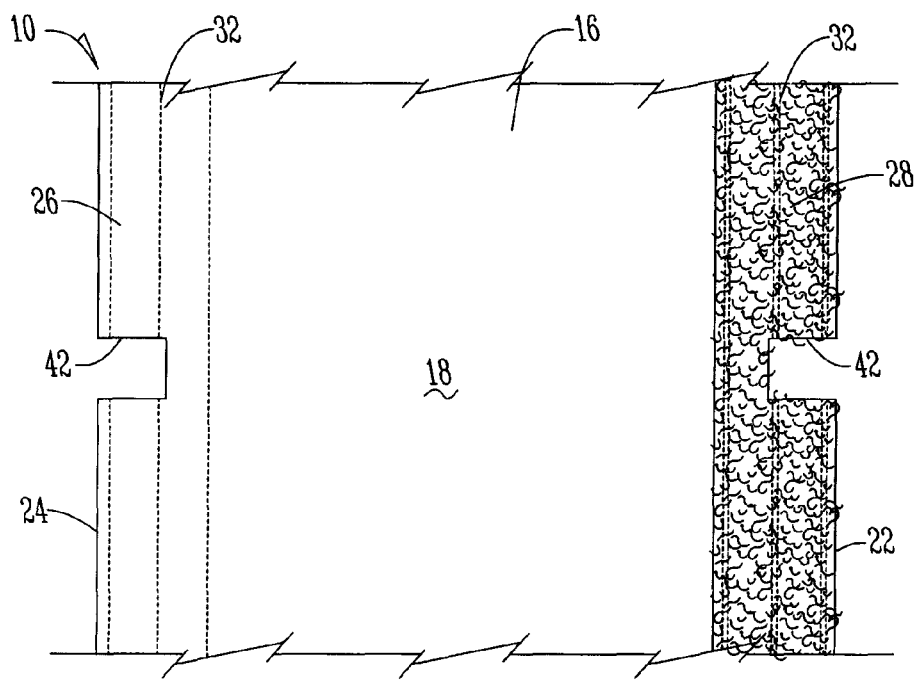
FIG. 8 is the reverse side of the present invention shown in FIG. 7.
Figure 9:
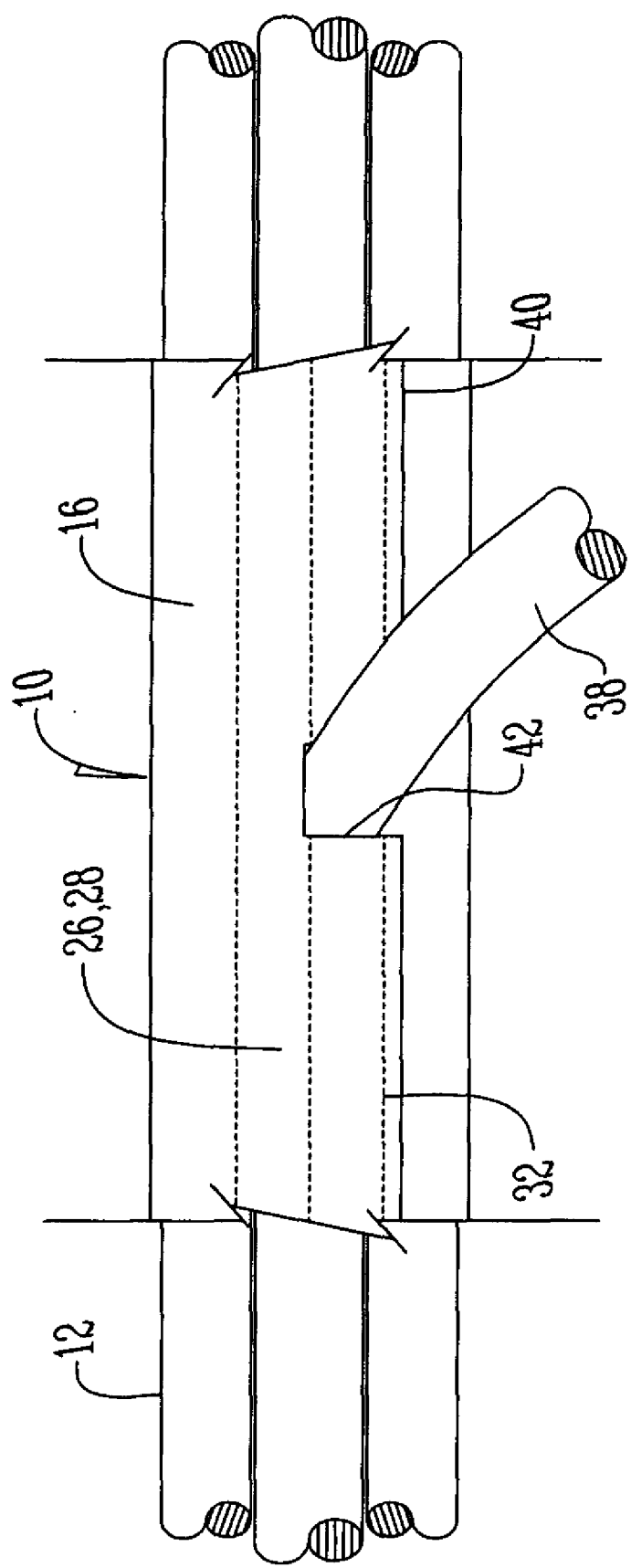
FIG. 9 is a view similar to FIG. 2 except that a hydraulic hose is shown exiting the present invention at a point along the length of the present invention.

As best shown in FIGS. 7-9, hose sleeve 10 can be notched to accommodate a hose 38 that, for functional reasons, needs to exit the hose sleeve 10 at a point along the length of hose sleeve 10. For smaller conduits, such as an office data line (not shown), notching is not necessary as the conduit can easily slip through the seam 40 created by wrapping the first edge 22 of elongated section of material 16 over the second edge 24. Seam 40 of hose sleeve 10 will properly seal around a smaller conduit without pinching or placing undue pressure on the smaller conduit. For larger conduits, such as hose 38, a notch 42 is necessary in order to ensure that the strips of hooks 26 and loops 28 properly engage with each other to form a strong connection.

Notch 42 may be cut as needed anywhere along the length of elongated section of material 16, as shown in FIGS. 7-8. Preferably, the notch 42 is cut into both edges 22 and 24 such that the elongated section of material 16 wraps around the exiting conduit 38 when installed, as shown in FIG. 9. Because of the layer 30 of adhesive, the strips of hooks 26 and loops 28 will not pull away from the elongated section of material 16 after notch 42 has been cut. Further, the layer 30 of adhesive prevents stitching 32 from unraveling after notch 42 has been cut into hose sleeve 10. The size of notch 42 depends entirely upon the size of the exiting conduit 38. Notch 42 can be easily cut with scissors.

In an alternative embodiment, hose sleeve 10 may be provided with a plurality of straps. These straps may be used to cinch the sleeve, hang or suspend the sleeve from another surface, or both, and are reusable. The straps secure the sleeve but do not cinch so tightly as to jeopardize the integrity or functionality of the hoses, cables or other contents thereof. Preferably, in long length applications, straps are evenly spaced and provided at approximately three-foot intervals, but it will be appreciated that the straps can be spaced at virtually any interval.

Figure 10:
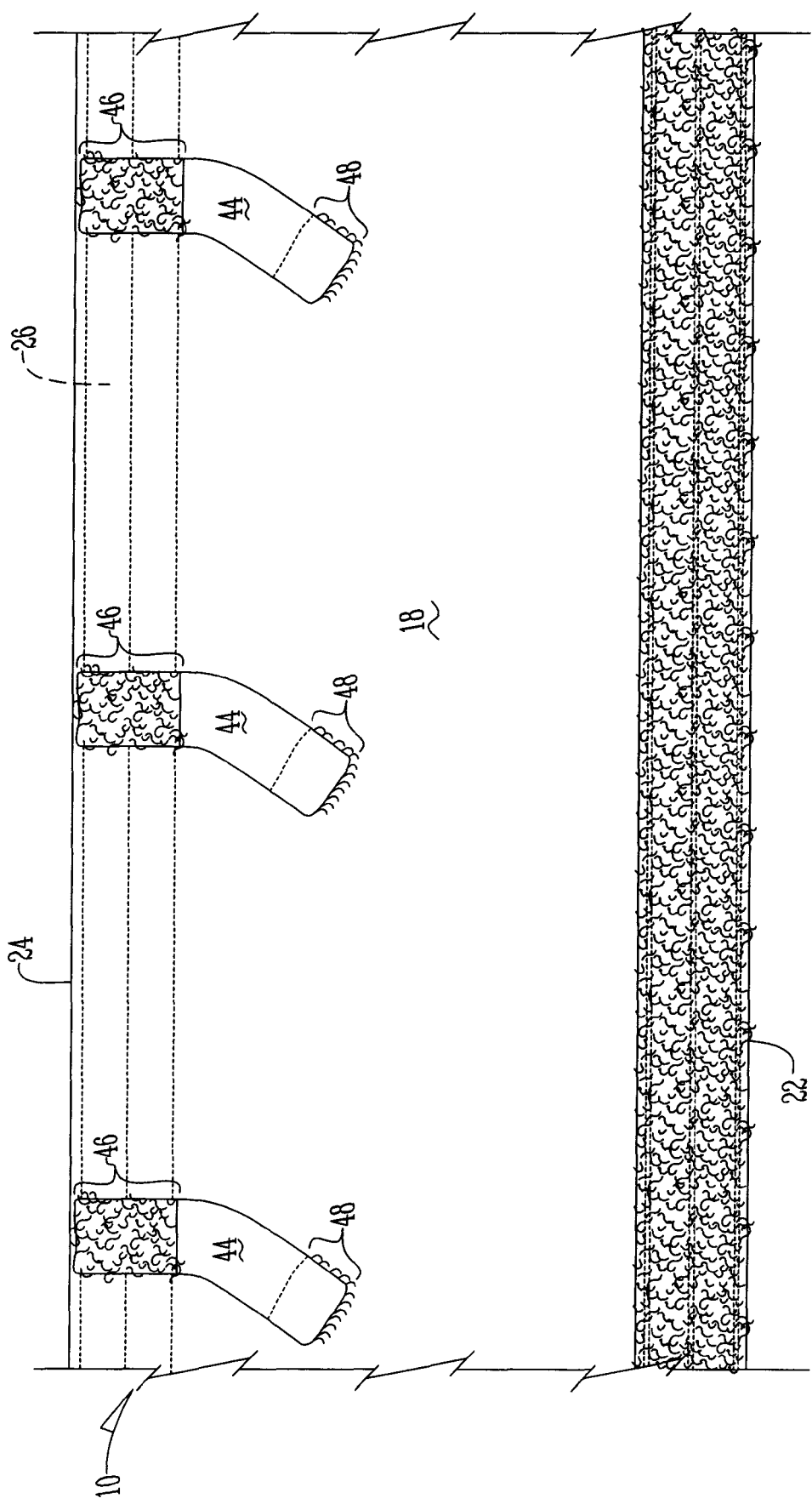
FIG. 10 is a plan view of an alternative embodiment of the present invention when opened and lying flat.
Figure 11:
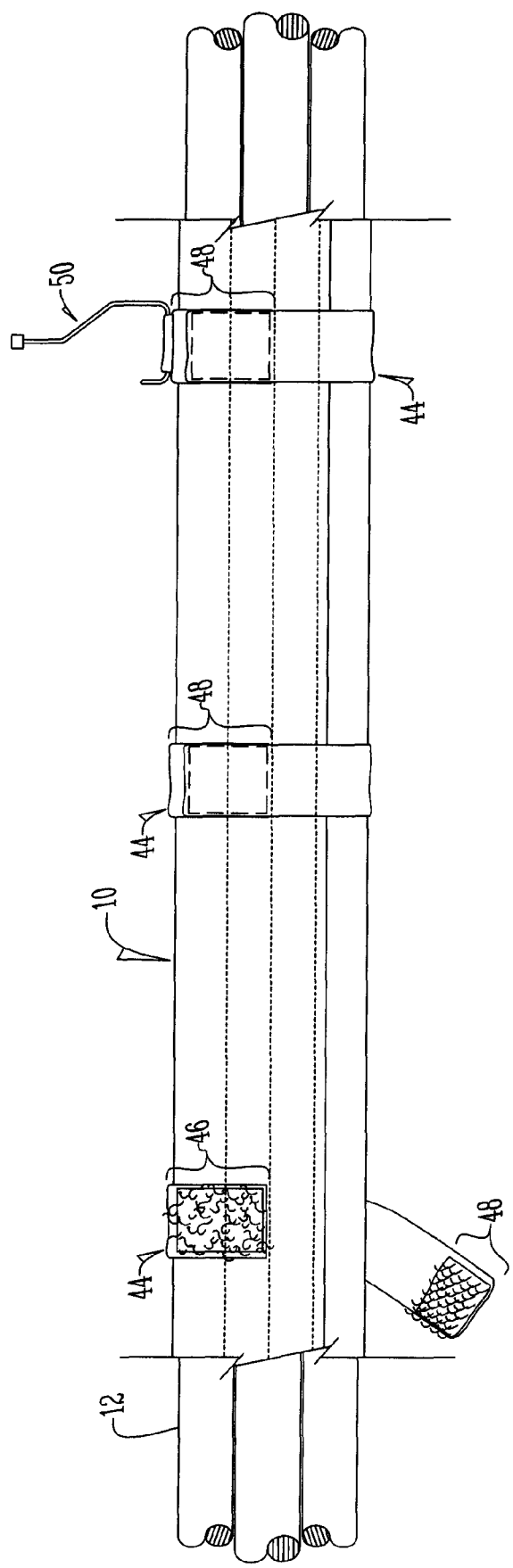
FIG. 11 is a side view of an alternative embodiment of the present invention when fastened around hydraulic hoses.
Figure 12:
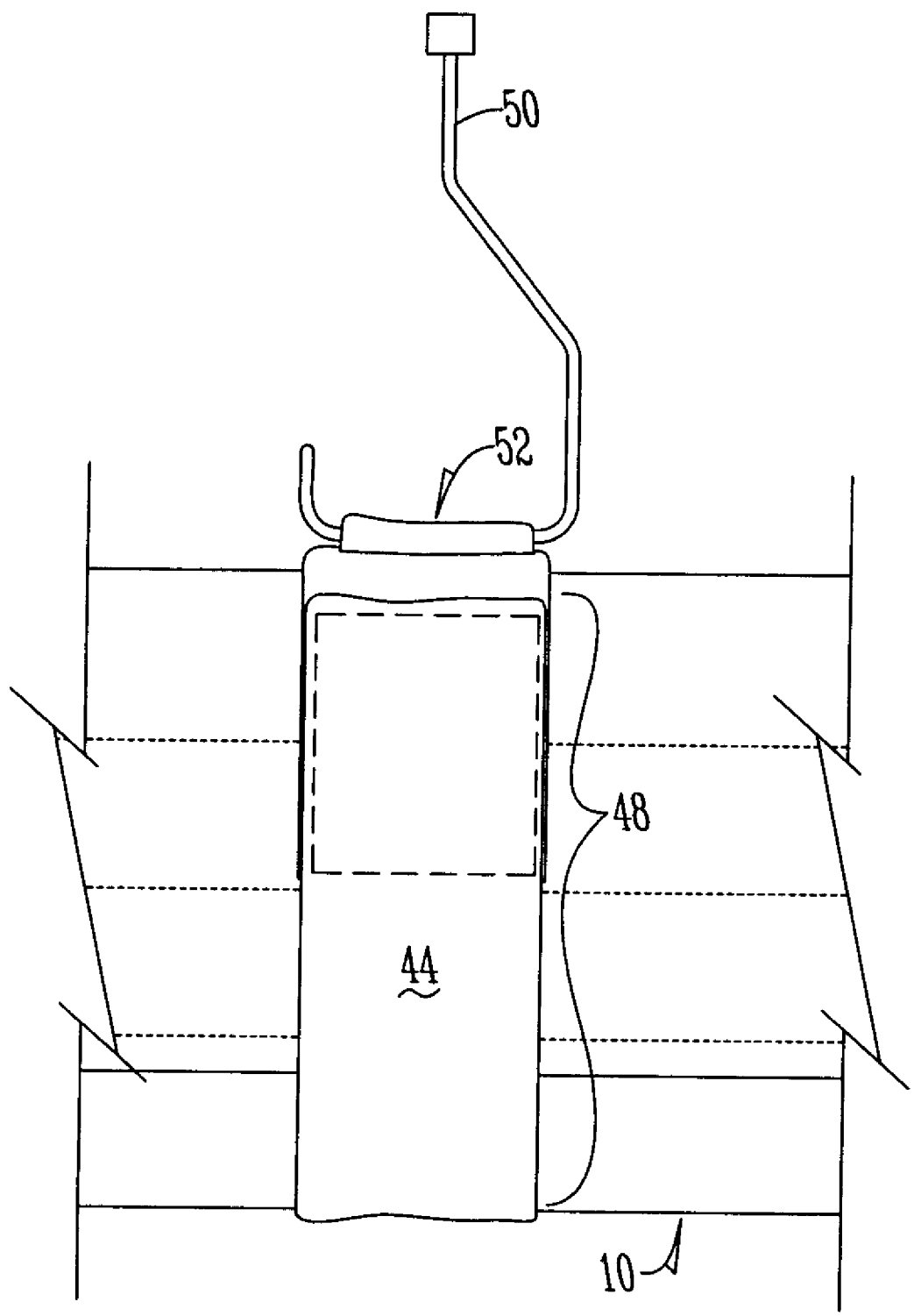
FIG. 12 is a partial side view of an alternative embodiment of the present invention.

Referring to FIGS. 10-12, hose sleeve 10 features reusable cinch straps 44. Cinch straps 44 may be made of nylon or any other suitable, durable material, including the same material as hose sleeve 10. As shown in FIG. 10, cinch straps 44 are preferably sewn to hose sleeve 10, such that first end 46 of cinch strap 44 is sewn onto front surface 18 at second edge 24, opposite of strip of hooks 26. Second end 48 of cinch strap 44 extends generally in the direction of first edge 22 but is free.

Cinch straps 44 may be secured by a number of means, including complementary strips of hook and loop adhesive or Velcro®, snaps, buckles or the like attached to opposite sides of first end 46 and second end 48. In an exemplary embodiment, shown in FIGS. 10-11, each cinch strap 44 features a complementary pair of Velcro® strips. The securing means is provided so as to facilitate sleeves of varying diameter. For example, a length of Velcro® greater than the anticipated contact area can be provided, as could multiple snaps or adjustable buckles.

It will be appreciated that second end 48 of cinch strap 44 is wrapped around hose sleeve 10 until it meets up with first end 46 of cinch strap 44. First end 46 and second end 48 of cinch strap 44 are secured to one another via the hook and loop material or Velcro®.

For hanging applications, cinch straps 44 can be utilized as hang points for any number of external hanging apparatus or implements such as hooks, anchors, bolts, studs or the like. For example, referring to FIG. 11, a hook 50 has been looped under cinch strap 44. In yet another embodiment, an outward facing surface of cinch strap 44 may be provided with an exterior loop 52 (FIG. 12) through which hook 50 or other hanging implements can be placed, so as to avoid unnecessary contact or abrasion between hook 50 and hose sleeve 10.

It should be appreciated that hooks or other hanging apparatus could be integral with hose sleeve 10, and need not be integral with cinch straps 44. For example, front surface 18 of hose sleeve 10 could be provided with exterior loops, hooks or other hanging apparatus independent of cinch straps 44.

What is claimed is:

1. A reusable hose bundling sleeve comprising:
    an elongated section of material having a urethane coating and wherein the opposite edges of opposite sides of the elongated section of material are folded over such that a first lip is formed on a front surface and a second lip is formed on a reverse surface of the elongated section of material;
    strips of hooks and loops attached to opposite edges of opposite sides of the elongated section of material such that the strips of hooks and loops engage when the elongated section of material is folded to form a tubular shape;
    said strips of hooks and loops being sewn to the elongated section of material with chain stitches; and
    a layer of adhesive disposed between the strips of hooks and loops and the elongated section of material;
    wherein the chain stitches have a single strand runner on one side and a double strand runner on the other side and the double strand runner is located on the inside of the sleeve when the elongated section of material is folded over to form a tubular shape.

2. The sleeve of claim 1 wherein each strip of hooks and loops is attached to the elongated section of material with three rows of stitching.

3. The sleeve of claim 1 wherein the ratio of the width of each strip of hooks and loops to the width of the elongated section of material is one to five.

4. The sleeve of claim 1 further comprising one or more cinching straps.

5. The sleeve of claim 4 wherein said cinching straps are provided at approximately three foot intervals.

6. The sleeve of claim 4 wherein said cinching straps are adapted to receive hanging implements.

7. The sleeve of claim 4 wherein said cinching straps further comprise one or more hanging apparatus selected from the group consisting of loops and hooks.

8. The sleeve of claim 4 wherein the one or more cinching straps are affixed to the front surface of the elongated section of material.

9. The sleeve of claim 8 wherein each of the one or more cinching straps includes a first end of affixed to the front surface at an edge of the elongated section of material and a free second end.

10. The sleeve of claim 9 wherein each of the one or more cinching straps include complimentary strips of hooks and loops on opposite sides of the first end and second end.

11. The sleeve of claim 1 further comprising one or more hanging apparatus selected from the group consisting of loops and hooks.

12. The sleeve of claim 1 wherein one of the strip of loops and the strip of hooks is attached to the front surface of the elongated section of material over the first lip and adjacent a first edge of the elongated section of material.

13. The sleeve of claim 1 wherein one of the strip of loops and the strip of hooks is attached to the reverse surface of the elongated section of material over the second lip and adjacent a second edge of the elongated section of material.

14. A reusable hose bundling sleeve comprising:
an elongated section of material having a urethane coating and wherein opposite edges of opposite sides of the elongated section of material are folded over such that a first lip is formed on a front surface and a second lip is formed on a reverse surface of the elongated section of material;
strips of hooks and loops attached to the opposite edges of opposite sides of the elongated section of material such that the strips of hooks and loops engage when the elongated section of material is folded to form a tubular shape;
said strips of hooks and loops being sewn to the elongated section of material with chain stitches;
a layer of adhesive disposed between the strips of hooks and loops that are sewn to the elongated section of material with chain stitches and the elongated section of material; and
at least one notch within the elongated section of material.

* * * * *